United States Patent [19]

Stolzer

[11] 4,329,894
[45] May 18, 1982

[54] CUTTING MACHINE

[75] Inventor: Paul Stolzer, Achern, Fed. Rep. of Germany

[73] Assignee: Keuro Maschinenbau Gesellschaft mit beschränkter Haftung & Kommanditgesellschaft, Achern, Fed. Rep. of Germany

[21] Appl. No.: 187,632

[22] Filed: Sep. 16, 1980

[30] Foreign Application Priority Data

Sep. 22, 1979 [DE] Fed. Rep. of Germany ... 7926952[U]

[51] Int. Cl.³ .............................................. B26D 7/02
[52] U.S. Cl. ...................................... 83/156; 83/157; 83/215; 83/282; 83/466; 83/436; 83/753
[58] Field of Search ............... 83/156, 157, 215, 216, 83/240, 277, 282, 441, 457, 466, 753, 754, 757, 758, 759, 764, 765, 766, 781, 436

[56] References Cited

U.S. PATENT DOCUMENTS

| | | | |
|---|---|---|---|
| 3,174,373 | 3/1965 | Gensman | 83/157 X |
| 3,194,100 | 7/1965 | Fehlberg | 83/282 X |
| 3,211,085 | 10/1965 | Zeppebello | 83/157 X |
| 3,941,022 | 3/1976 | Sato et al. | 83/466 X |
| 3,945,282 | 3/1976 | Aizawa | 83/277 X |
| 4,080,858 | 3/1978 | Stolzer | 83/282 X |
| 4,100,829 | 7/1978 | Stangl et al. | 83/282 X |

Primary Examiner—Frank T. Yost
Assistant Examiner—Robert P. Olszewski
Attorney, Agent, or Firm—Spencer & Kaye

[57] ABSTRACT

In a cutting machine composed of a machine base carrying a workpiece table defining a workpiece support surface, a workpiece feed rollway presenting a workpiece carrying surface and disposed for feeding a workpiece onto the table, and a pair of clamping jaws mounted on the workpiece table for permitting passage therebetween of a workpiece fed by the feed rollway, at least one of the clamping jaws being movable relative to the other jaw in a direction transverse to the direction of feed effected by the feed rollway for clamping a workpiece on the table, there is further provided: a pivot bearing supporting the machine base for pivotal movement about a pivot axis which is substantially horizontal and parallel to the feed rollway feed direction; and a vertical displacement mechanism operatively associated with the machine base for pivoting the base between a workpiece feed position in which the workpiece support surface is below the workpiece carrying surface and a workpiece cutting position in which the workpiece support surface is substantially aligned with the workpiece carrying surface.

8 Claims, 2 Drawing Figures

CUTTING MACHINE

BACKGROUND OF THE INVENTION

The present invention relates to a cutting machine of the type constituted by a hacksaw machine, a cold circular saw, a horizontal band saw, an abrasive cutting machine, or the like, having a machine base, a workpiece table, and clamping jaws for holding rod-shaped material to be machined in place on the workpiece table for the machining procedure, and in which at least one of these clamping jaws is movable for the clamping motion at right angles to the material feed direction, the material to be machined can be fed to the cutting machine via a roller track, or rollway, in the plane of the workpiece table, and the severed material can be removed optionally via a roller track arranged behind the cutting machine in the plane of the workpiece table.

In such conventional cutting devices, the problem exists that the rod-shaped material must be dragged across the machine table during feeding and thereby offers considerable resistance to the feed means, which latter is frequently controlled in its feeding movement in correspondence with the length of the severed piece. In many cases, the cutting machine is furthermore constructed so that one of the clamping jaws is fixedly mounted and only the other clamping jaw is movable so that there is also friction between the fixed clamping jaw and the material to be machined during the feeding operation.

To control this problem, it is known to arrange the roller tracks to be liftable and lowerable so that the roller track can be lifted during workpiece advancement. Consequently, the workpiece material being fed cannot come into contact with the workpiece table of the machine base. For cutting machines having a fixed clamping jaw, the additional feature is employed of moving the "fixed" clamping jaw, for the feeding operation, away from the workpiece material by a small amount.

These conventional measures are expensive. It is necessary to construct one or two roller tracks to be liftable and lowerable, requiring several cylinder-piston units, by way of which the roller tracks are supported. Additionally, conduit connections must be provided to the cylinder-piston units, which latter are frequently prone to damage from the outside. Moreover, the aforementioned special feature must be provided for the "fixed" clamping jaw, which likewise necessitates a cylinder-piston unit with corresponding control means.

SUMMARY OF THE INVENTION

It is an object of the invention to construct a cutting machine of the type mentioned hereinabove so as to allow for disengagement of the workpiece material to be fed from the workpiece of the cutting machine and, optionally from the fixed clamping jaw, in a way which is substantially simpler and safer in operation than the conventional arrangements.

A further object of the invention is to reduce the manufacturing cost of machines having such capabilities.

These and other objects are achieved, according to the invention, by the provision of a vertical displacement mechanism for automatically pivoting the machine base of the cutting machine about a horizontal axis extending parallel to the workpiece feed direction, the mechanism extending between the machine base and the supporting surface of the cutting machine, in such a way that the workpiece table is lowered with respect to the plane of the roller tracks during the feeding of the material and is level with the plane of the roller tracks during the cutting operation.

By these measures in accordance with the invention, it is possible to construct the roller tracks to themselves be fixed in a simple way. On the other hand, it is merely necessary to arrange a pivot bearing at the cutting machine and to operate the mechanism to place the cutting machine, on the one hand, in a position suitable for the material feeding step and, on the other hand, in a position suitable for the machining period. Due to the fact that the cutting machine, during feeding of the material, is lowered with respect to the plane of the roller track, the material to be fed is disengaged from the table surface of the cutting machine and from the fixed clamping jaw and thus can be advanced unhindered. After completion of the feeding step, the cutting machine is lifted again correspondingly, so that its table surface is in alignment with the plane of the roller tracks, and the associated clamping jaw is in alignment with the vertical guide for the material. The material is then clamped in place and machined.

It is advantageous, in cutting machines having one fixed clamping jaw, to arrange the pivot axis in the zone of the displaceable clamping jaw, below the latter, and to provide the vertical displacement mechanism in the vicinity of the fixed clamping jaw. With this form of construction, therefore, the cutting machine is lowered for the step of feeding the material by means of the mechanism, while, for the period of machining the material, the machine base is raised and maintained in the raised position. This is readily possible in modern cutting machines, since such machines are usually equipped with a hydraulic circuit constantly providing the necessary pressure medium for a vertical displacement mechanism in the form of a cylinder-piston unit.

Advantageously, if the vertical displacement mechanism is in the form of a hydraulic cylinder-piston unit, the piston rod of this unit engages the machine base, whereas its cylinder acts on the supporting surface of the cutting machine, wherein the cylinder-piston unit can be arranged underneath the machine base.

It is also expedient to synchronize the control of the vertical displacement mechanism with the clamping motion of the clamping jaws. In this way, the operation of the mechanism is in synchronism with the feeding motion of the material to be machined.

Finally, it has proven to be especially advantageous to give the plane extending through the pivot axis of the machine base and the abutment of the workpiece against the clamping jaw closer to the cylinder-piston unit an inclination of the order of 45°.

DESCRIPTION OF THE PREFERRED EMBODIMENTS

Figure 1:
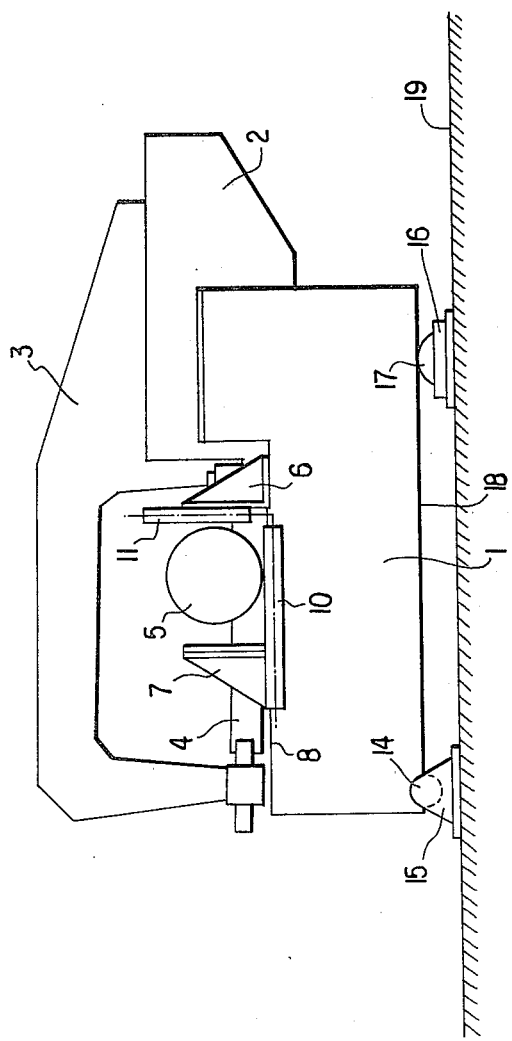
FIG. 1 is an elevational, simplified pictorial view a cutting machine in the form of a hacksaw machine constructed according to a preferred embodiment of the invention.

FIG. 1 shows a hacksaw machine composed of a machine base 1 to which a machine superstructure 2 is pivotably attached, a hacksaw 3 mounted to execute a reciprocating movement in the superstructure in order to sever, with its saw blade 4, a workpiece of rod-shaped material 5.

The material 5 to be machined is clamped, for the machining phase, between clamping jaws 6 and 7, clamping jaw 6 being fixedly mounted whereas clamping jaw 7 is displaceable to effect clamping and unclamping. In FIG. 1, the clamping jaws are shown in the opened, or unclamping, condition. The workpiece 5 rests on the workpiece table 8 of the machine base 1 for the machining step.

Figure 2:
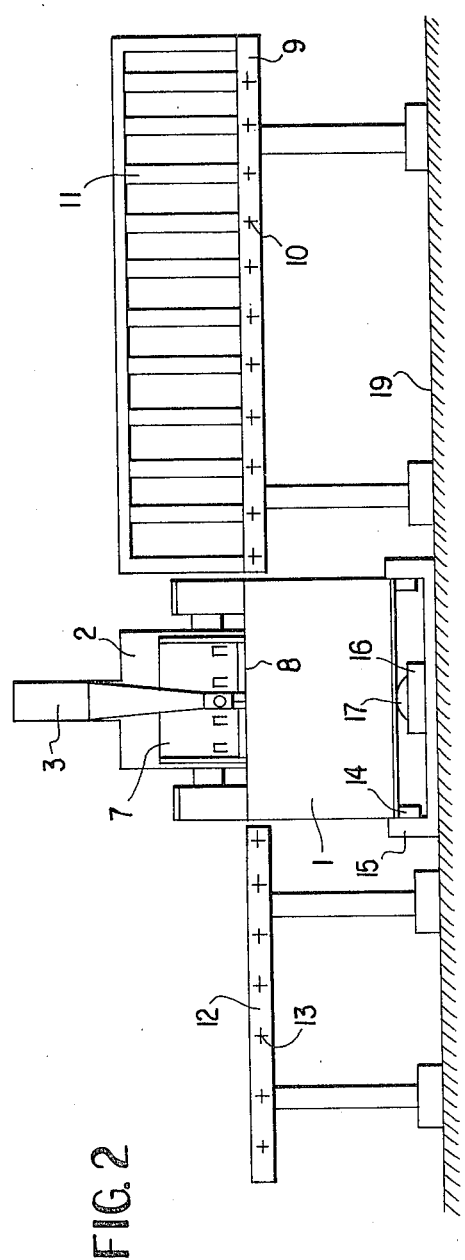
FIG. 2 is an elevational view of the cutting machine of FIG. 1 viewed in a direction perpendicular to the view of FIG. 1.

As can clearly be seen in FIG. 2, a workpiece 5 is fed by way of a roller track 9 formed of horizontal rollers 10 and vertical rollers 11, guiding the workpiece. The cutting machine is followed by a roller track 12 with rollers 13 via which severed workpieces are carried away.

As is shown in FIGS. 1 and 2, the machine frame 1 is pivotable via bearings 14 and supports 15 carrying these bearings, wherein the bearings 14 are arranged in the zone of the displaceable clamping jaw 7, underneath the latter. It is especially advantageous herein to provide that the plane passing through the bearings 14 and the abutment of the workpiece 5 against the fixed clamping jaw 6 has approximately an angle of 45° to the horizontal.

The pivotal motion is produced by a cylinder-piston unit 16 in the region of the fixed clamping jaw 6, with the piston rod 17 of unit 16 engaging the underside 18 of the machine.

The mode of operation of the cylinder-piston unit 16 can be made dependent on the movement and/or position of the movable clamping jaw 7 or can be otherwise synchronized therewith, for example by means of a suitable electrical or hydraulic system.

The mode of operation of the device described thus far is as follows:

FIG. 1 illustrates the operating state in which the clamping jaws 6 and 7 are in the opened condition, ready for the feeding in of material 5. After the saw blade 4 has been moved, by pivoting the parts 2 and 3 in the upward direction, out of the feeding path of the material, the material feed can be effected. For this purpose, the machine is pivoted with the aid of the cylinder-piston unit 16 about the pivotal bearing 14 in the clockwise, or downward, direction so that the plane of table 8 comes to lie below the feeding plane constituted by the rollers 10. Correspondingly, the abutment plane for the material defined by fixed jaw 6 is pivoted behind the bearing plane defined by rollers 11, so that the material in its entirety can be advanced without possibility of contact with the table 8 and the fixed clamping jaw 6. This is the configuration shown in FIG. 1.

After this material feeding step has been accomplished, the machine is pivoted upwardly by operation of the cylinder-piston unit 16 to such an extent that the plane of the machine table 8 comes into alignment with the plane of the rollers 10 and 13 of the roller tracks 9 and 12, the material 5 likewise coming effectively into contact with the fixed clamping jaw 6. Thereupon the material 5 is clamped in place by moving the displaceable clamping jaw 7 in the clamping direction, and the next cutting step can begin. After this cutting operation has been accomplished, the machine is lowered again to the level illustrated in FIG. 1, and after the hacksaw frame has been pivoted upwardly, the subsequent material feeding step can be performed.

It is possible in this way to fashion the roller tracks 9 and 12 as a fixed device in a simple way and merely to pivot the machine to prevent sliding contact between the workpiece material 5, on the one hand, and the machine table 8 and/or the fixed clamping jaw 6, on the other hand.

It will be understood that the above description of the present invention is susceptible to various modifications, changes and adaptations, and the same are intended to be comprehended within the meaning and range of equivalents of the appended claims.

What is claimed is:

1. In a cutting machine composed of a machine base carrying a workpiece table defining a workpiece support surface, workpiece feed means in the form of rollway presenting a workpiece carrying surface and disposed for feeding a workpiece onto the table, and a pair of clamping jaws mounted on the workpiece table for permitting passage therebetween of a workpiece fed by the feed means, at least one of the clamping jaws being movable relative to the other jaw in a direction transverse to the direction of feed effected by the feed means for clamping a workpiece on the table, the improvement comprising: means supporting said machine base for pivotal movement about a pivot axis which is substantially horizontal and parallel to the feed means feed direction; and vertical displacement means operatively associated with said machine base for pivoting said base between a workpiece feed position in which said workpiece support surface is below said workpiece carrying surface and a workpiece cutting position in which said workpiece support surface is substantially aligned with said workpiece carrying surface.

2. An arrangement as defined in claim 1 wherein said machine is disposed on a supporting surface and said displacement means are connected between said machine base and the supporting surface.

3. An arrangement as defined in claim 1 or 2 further comprising workpiece removal means in the form of a rollway located at the opposite side of said base from said feed means and presenting a workpiece carrying surface aligned with said feed means carrying surface.

4. An arrangement as defined in claim 1 wherein said other clamping jaw is fixed to said table, said pivot axis is located in the zone of, and beneath, said one clamping jaw, and said displacement means are disposed in the zone of said other clamping jaw.

5. An arrangement as defined in claim 2 or 4 wherein said displacement means comprise a hydraulic cylinder-piston unit having a piston engaging said machine base and a cylinder bearing against the supporting surface.

6. An arrangement as defined in claim 5 wherein said cylinder-piston unit is located beneath said machine base.

7. An arrangement as defined in claim 1 or 4 wherein the control of said displacement means is synchronized with the clamping movements of said one clamping jaw.

8. An arrangement as defined in claim 4 wherein said pivot axis and other clamping jaw are located relative to one another such that the plane extending through the pivot axis and the location where a workpiece abuts against said fixed clamping jaw has an inclination of the order of 45° C.

* * * * *